US009635302B2

(12) United States Patent
Wu et al.

(10) Patent No.: US 9,635,302 B2
(45) Date of Patent: Apr. 25, 2017

(54) ACTIVE PIXEL SENSOR DEVICE AND OPERATING METHOD OF THE SAME

(71) Applicant: ELAN MICROELECTRONICS CORPORATION, Hsin Chu (TW)

(72) Inventors: Po-Hao Wu, Zhubei (TW); Chun-Kai Liu, Hsinchu (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 0 days.

(21) Appl. No.: 14/791,673

(22) Filed: Jul. 6, 2015

(65) Prior Publication Data

US 2016/0037095 A1 Feb. 4, 2016

(30) Foreign Application Priority Data

Jul. 31, 2014 (TW) .............................. 103126225 A

(51) Int. Cl.
| | |
|---|---|
| *H04N 3/14* | (2006.01) |
| *H04N 5/335* | (2011.01) |
| *H04N 5/378* | (2011.01) |
| *H04N 5/341* | (2011.01) |
| *H04N 5/343* | (2011.01) |
| *H04N 5/347* | (2011.01) |
| *G06K 9/00* | (2006.01) |

(52) U.S. Cl.
CPC ........... *H04N 5/378* (2013.01); *G06K 9/0004* (2013.01); *H04N 5/341* (2013.01); *H04N 5/343* (2013.01); *H04N 5/347* (2013.01); *G06K 2009/00932* (2013.01); *G06K 2009/00939* (2013.01)

(58) Field of Classification Search
CPC .... G06K 9/00006; H04N 5/378; H04N 5/343; H04N 5/341; H04N 5/347
USPC ........ 348/294–324; 250/208.1; 257/290–292
See application file for complete search history.

(56) References Cited

U.S. PATENT DOCUMENTS

| | | | |
|---|---|---|---|
| 6,809,767 B1 | 10/2004 | Kozlowski et al. | |
| 2009/0316015 A1 | 12/2009 | Iwasa et al. | |
| 2010/0243866 A1* | 9/2010 | Mo ........................... | H03F 3/08 250/214 A |
| 2013/0153752 A1* | 6/2013 | Sakurai ................. | H01L 27/144 250/208.2 |

(Continued)

FOREIGN PATENT DOCUMENTS

| | | |
|---|---|---|
| TW | 200411918 A | 7/2004 |
| TW | 201242352 A | 10/2012 |

*Primary Examiner* — Yogesh Aggarwal
(74) *Attorney, Agent, or Firm* — patenttm.us

(57) ABSTRACT

An active pixel sensor device and the method thereof include an active pixel sensing array and a synchronous reading circuit. The active pixel sensing array is formed by a plurality of sensing pixels disposed in a form of an array. Each sensing pixel has a power terminal. The synchronous reading circuit connects to the power terminals of all sensing pixels, detects a summation of currents flowing through all sensing pixels, converts the summation of currents to an output signal, and outputs the output signal that represents the optical sensing information. In addition to reading each sensing pixel, the active pixel sensor device further controls the synchronous reading circuit to read the output signal corresponding to the summation of currents of all sensing pixels. The active pixel sensor device using the same active pixel sensing array can be applied to large-area sensing.

20 Claims, 7 Drawing Sheets

(56) References Cited

U.S. PATENT DOCUMENTS

2014/0022427 A1* 1/2014 Goto .................... H04N 5/2355
                                                      348/296
2014/0078363 A1* 3/2014 Amikawa .............. H04N 5/376
                                                      348/300

* cited by examiner

ACTIVE PIXEL SENSOR DEVICE AND OPERATING METHOD OF THE SAME

BACKGROUND OF THE INVENTION

1. Field of the Invention

The invention relates to an active pixel sensor device and, in particular, to an active pixel sensor device with different operation modes.

2. Description of Related Art

There are two types of optical sensor devices for fingerprint recognition. One is the passive pixel sensor (PPS) device, and the other is the active pixel sensor (APS) device. In both types of pixel sensor devices, fingerprint recognition is carried out by resetting sensing pixels of the pixel sensor device, exposing the sensing pixels, reading sensing currents of the sensing pixels, and converting the sensing currents into corresponding sensing voltages. However, in addition to the fingerprint recognition function, there are many other optical sensing applications, such as detecting ambient brightness and detecting pulses. The pulse detection is performed by detecting the contraction and expansion of micro blood vessels. The resolution required by such applications is lower than that required by fingerprint recognition.

To integrate the above-mentioned two applications, the optical sensor device usually has an APS device and a photo sensor device. As shown in FIG. 7, the APS device 60 includes an active pixel sensing array 601, a reset and selection circuit 61, and a signal reading circuit 62. Before the active pixel sensing array 601 has an exposure, the reset and selection circuit 61 resets each sensing pixel P11~Pmn on the active pixel sensing array 601 in sequence, then exposes the active pixel sensing array 601. After the exposure is complete, the reset and selection circuit 61 selects the sensing pixels in a row, and the signal reading circuit 62 reads sensing voltages corresponding to the sensing currents. The photo sensor device 70 includes a photo sensing array 701 and a signal reading circuit 72. The sensing pixels of the photo sensor array 701 have a relative larger photo sensing area. Therefore, after the photo sensor array 701 is reset and exposed, the sensing current detected by the signal reading circuit 72 is converted into a corresponding sensing voltage. The sensing voltage is used to determine the intensity of the ambient brightness or the variation in the contraction and expansion of micro blood vessels on a finger.

Accordingly, to integrate two or more different applications, the optical sensor device has to use two different sensors, such as the active pixel sensing array 601 and the photo sensing array 701. Moreover, the two different sensing arrays have different circuit designs, and result in increasing both the cost and size of the entire device. In the example of having fingerprint recognition and pulse measurements, the user needs to place his finger on different regions corresponding to the different sensors for different purposes. Such operation is not convenient and needs to be improved.

SUMMARY OF THE INVENTION

In view of the foregoing, an objective of the invention is to provide an active pixel sensor device.

To achieve the above-mentioned objective, the active pixel sensor device includes:

an active pixel sensing array having a plurality of sensing pixels arranged in a form of an array, wherein each sensing pixel has a power terminal, and the sensing pixels are divided into at least one group; and a synchronous reading circuit connecting to the power terminals of all of the sensing pixels of the active pixel sensing array for detecting a summation of sensing currents flowing through the sensing pixels of the at least one group to obtain a current sum, wherein the current sum is output to the synchronous reading circuit via the power terminals, the synchronous reading circuit converts the current sum into an output signal and outputs the output signal as a measured value of optical sensing.

According to the above-mentioned description, the synchronous reading circuit connects the power terminals of all the sensing pixels. Thus, it can detect the current sum flowing through the sensing pixels and converts it to a sensing voltage for output. In addition to reading the sensing voltages of the active sensing pixels for fingerprint sensing, the active pixel sensor device can control the synchronous reading circuit to read a sensing voltage corresponding to the current sum of all of the sensing pixels simultaneously. Thus, the active pixel sensor device uses the same active pixel sensing array on another application requiring a larger photo sensing area, such as detecting ambient brightness or measuring the pulse. Consequently, the invention requires only a single active pixel sensing array for high-resolution fingerprint recognition and detection of ambient brightness and pulses. The invention has advantages of low cost, simpler circuit, and smaller size. Moreover, the user only needs to place his finger on the same active pixel sensing array, which is relatively easy and convenient.

DETAILED DESCRIPTION OF THE PREFERRED EMBODIMENT

The invention modifies an active pixel sensor device to provide two operation modes. The following describes different embodiments of the invention.

Figure 1:
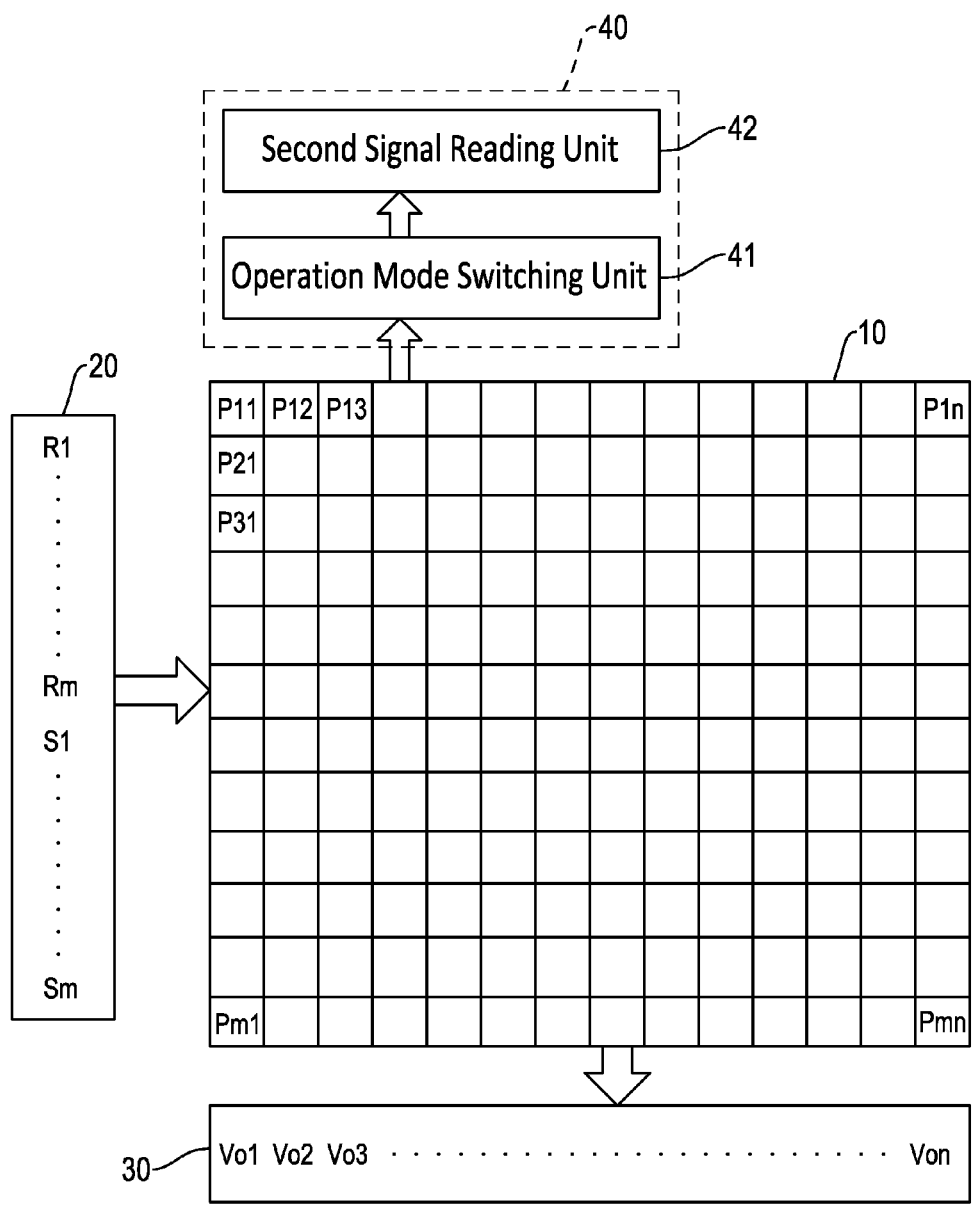
FIG. 1 is a circuit block diagram according to a first embodiment of the active pixel sensor device.

A first embodiment of the active pixel sensor device is shown in FIG. 1. The active pixel sensor device includes an active pixel sensing array 10, a reset and selection unit 20, a first signal reading unit 30, and a synchronous reading circuit 40.

The active pixel sensing array 10 is formed with a plurality of sensing pixels P11~Pmn disposed in a form of an array. As seen from the three sensing pixels P11~P13 in FIG. 2, each sensing pixel P11~P13 preferably adopts the 3T-APS structure; that is, each sensing pixel includes a reset switch M11, a source follower M12, a selection switch M13, and a photo detector PD. The reset switch M11 can be a MOSFET having a drain as a power terminal S, a gate as a reset terminal R1, and a source as a signal terminal. The power terminal S is connected to a work power Vdd. The source follower M12 can also be a MOSFET having a drain connecting to an operating power Va, a gate connecting to the signal terminal of the reset switch M11, and a source connecting to the selection switch M13. The selection switch M13 can also be a MOSFET having a drain connecting to the source of the source follower M12, a gate as a selection terminal, and a source as a voltage output terminal Vo1. The photo detector PD has a cathode connecting to the source of the reset switch M11, and an anode connecting to a ground terminal of the work power Vdd. The photo detector PD stores charges after the reset switch M11 turns on and off. After exposure to light, the amount of charges in the photo detector PD decreases at a rate with a positive correlation to the light intensity. Besides, each sensing pixel can also use the 4T-APS structure, not limited to the above-mentioned 3T-APS structure. The work power Vdd can have a same voltage level as the operating power Va, i.e., Vdd=Va. Depending on the practical needs, the work power Vdd and the operating power Va can be set to have different voltage levels, with the former slightly lower than the latter, Vdd<Va.

Moreover, the reset terminals of the sensing pixels in the same row of the active pixel sensing array 10 are connected together. Likewise, the selection terminals of the sensing pixels in the same row of the active pixel sensing array 10 are connected together. Therefore, the active pixel sensing array 10 has m reset terminals and m selection terminals. As a result, the sensing pixels in the same row can be simultaneously reset and selected. After the sensing data of the sensing pixel in the same row are read out, the sensing data may be decoded to obtain individual sensing data of each sensing pixel. Such a decoding technique is well-known to a person skilled in the art and is not further described herein. Aside from the above-mentioned scheme of same-row connections, one can also connect the reset terminal and the selection terminal of each sensing pixel to the reset and selection unit 20 independently, so that the reset and selection unit 20 can independently charge and read signals from individual sensing pixel. Besides, another feasible scheme is to connect all of the sensing pixels P11~Pmn together before connecting to the reset and selection unit 20. Therefore, the sensing pixels P11~Pmn can be simultaneously reset and selected. After the sensing data of all the sensing pixels P11~Pmn are read out, they are subsequently decoded to obtain the sensing data of individual sensing pixel. The reset and selection unit 20 connects to the reset terminals R1~Rm of the active pixel sensing array 10, in order to output a reset signal to the reset terminals R1~Rm of the sensing pixels and output a selection signal to the selection terminals S1~Sm of the active pixel sensing array 10.

The first signal reading unit 30 connects the voltage output terminals Vo1~Von of the sensing pixels P11~Pmn in order to read the sensing signals produced as the photo detectors PD have an exposure, such as sensing currents or sensing voltages. The sensing pixels in the same row are connected together to a same voltage output terminal. For example, the sensing pixels P11~Pm1 in the first row are connected to the first voltage output terminal Vo1; the sensing pixels P12~Pm2 in the second row are connected to the second voltage output terminal Vo2; and so on. Therefore, if the reset and selection unit 20 can select one row of sensing pixels, the first signal reading unit 30 reads out in sequence the sensing voltage of each row of sensing pixels from the voltage output terminals Vo1~Von.

The synchronous reading circuit 40 connects to the power terminals S of all the sensing pixels P11~Pmn via a measuring terminal M, thereby detecting a current sum Iout (sum) flowing through the sensing pixels P11~Pmn and converting the current sum Iout(sum) into an output signal for output. The output signal can be an output voltage or an output current. In this embodiment, as shown in FIG. 1, the synchronous reading circuit 40 includes an operation mode switching unit 41 and a second signal reading unit 42.

Figure 2:
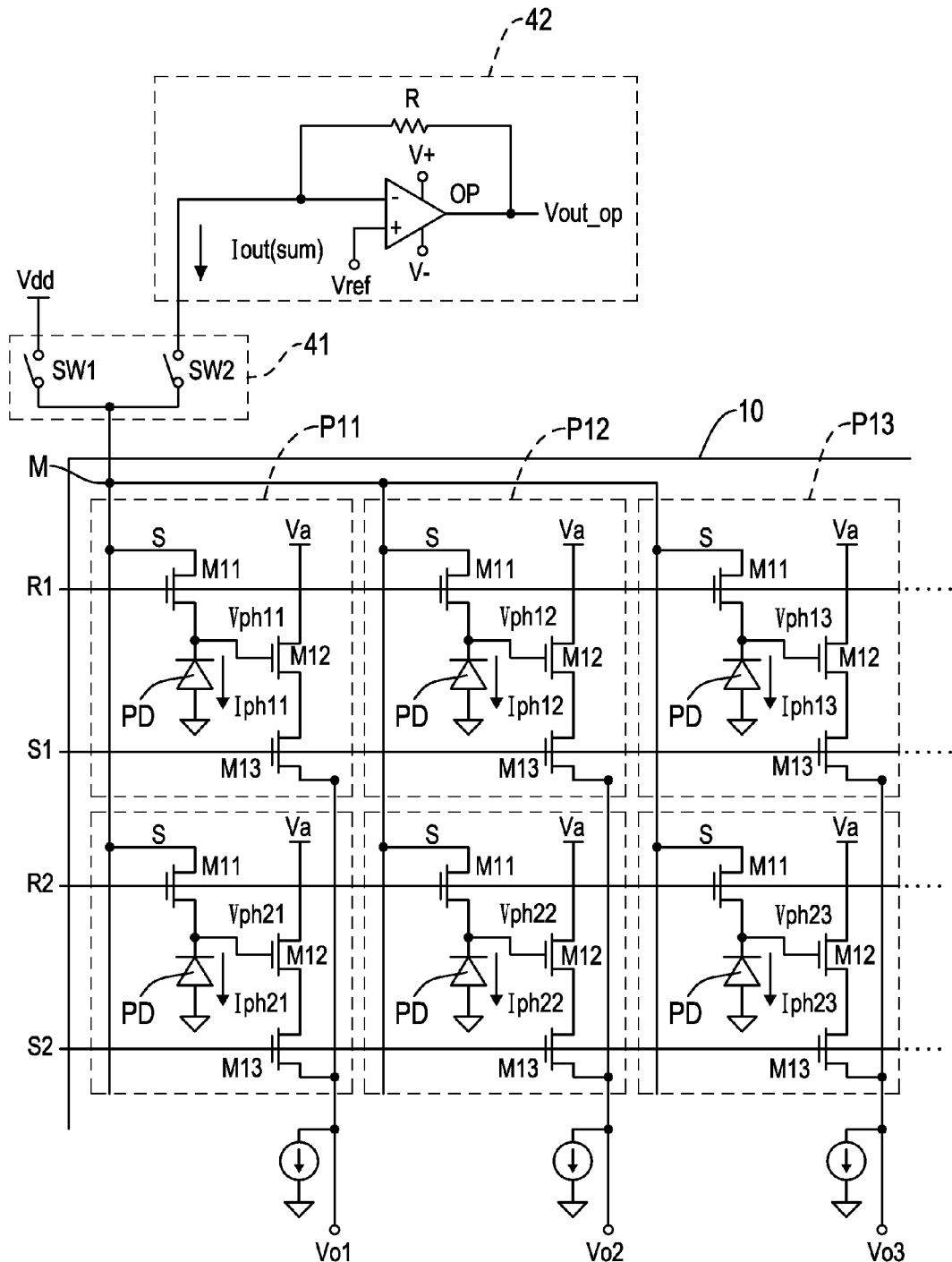
FIG. 2 is a circuit diagram of the first embodiment of the active pixel sensor device.

As shown in FIG. 2, the operation mode switching unit 41 includes a first switch SW1 and a second switch SW2. One end of each of the first switch SW1 and the second switch SW2 connects to the power terminal S of the sensing pixels P11~Pmn via the measuring terminal M. The other end of one of the switches (SW1 in this embodiment) connects to the work power Vdd. Therefore, the first switch SW1 connects between the power terminals S of all the sensing pixels P11~Pmn and the work power Vdd.

The second signal reading unit 42 connects to the other end of the second switch SW2. Through the second switch SW2 and the measuring terminal M, the second signal reading unit 42 connects to the power terminals S of all the sensing pixels P11~Pmn, and converts the current sum Iout(sum) to an output voltage or an output current. The following description uses a current-to-voltage conversion circuit as the second signal reading unit 42 and the output signal is an output voltage as the example. In this embodiment, the second signal reading unit 42 includes an operational amplifier OP and a resistor R. The work voltage required by the operational amplifier OP may come from the operating power Va or other DC sources. A non-inverting input terminal (+) of the operational amplifier OP connects to a reference voltage Vref, which can have the same voltage level as the work power Vdd, i.e. Vref=Vdd, or according to practical needs, some other voltage level, i.e. Vref≠Vdd. The resistor R connects between an inverting input terminal (−) and the output terminal Vout_op of the operational amplifier OP. The inverting input terminal (−) of the operational amplifier OP connects to the second switch SW2.

Figure 3:
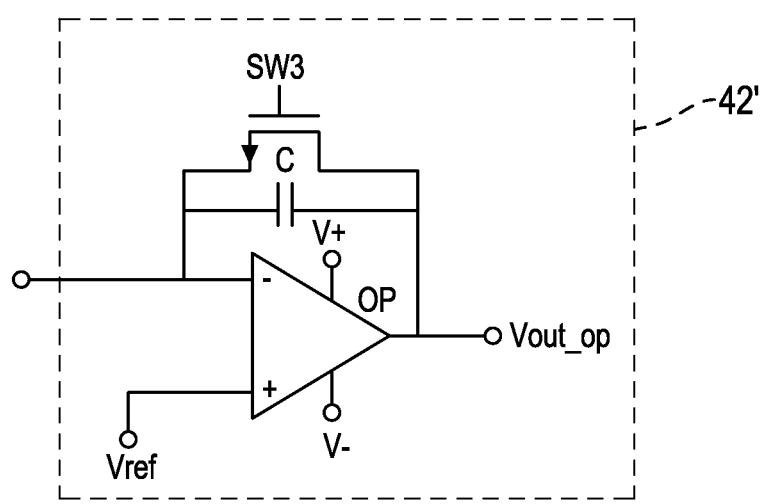
FIG. 3 is a circuit diagram of a second signal reading circuit.

As shown in FIG. 3, the second signal reading unit 42' in another embodiment includes an operational amplifier OP, a capacitor C, and a switch SW3. The work voltage required by the operational amplifier OP comes from the operating power Va or some other DC source. The non-inverting input terminal (+) of the operational amplifier OP connects to a reference voltage Vref, and the inverting input terminal (−) of the operational amplifier OP connects to the second switch SW3. The capacitor C connects between the inverting input terminal (−) and the output terminal Vout_op of the operational amplifier OP. The switch SW3 and the capacitor C are connected in parallel.

As shown in FIG. 2, when the invention is operated under a first operation mode, such as fingerprint recognition, the first switch SW1 of the operating mode switching unit 41 is controlled to connect to the work power Vdd, and the second switch SW2 is disconnected from the second signal reading unit 42. Therefore, the power terminals S of the sensing pixels P11~Pmn connect to the work power Vdd. In this case, the reset and selection unit 20 outputs the reset signals to the reset terminals R1~Rm of the sensing pixels P11~Pmn respectively, charging the photo detectors PD for exposure. Each photo detector PD then produces a sensing current. Therefore, the reset and selection unit 20 further outputs the selection signals to the sensing pixels which have been reset. The first signal reading unit 30 reads the sensing voltages on the voltage output terminals of the sensing pixels which have been reset. In this way, the respective sensing voltages of the sensing pixels for fingerprint recognition are obtained.

When the invention is operated under a second operating mode, such as ambient brightness detection or pulse detection, a larger optical sensing area is required. Therefore, the first switch SW1 is disconnected from the work power Vdd. The second switch SW2 is controlled to connect to the second signal reading unit 42. In this case, the power terminals S of all the sensing pixels P11~Pmn are connected to the inverting input terminal (−) of the second signal reading unit 42 via the measuring terminal M, so that the power terminals S of the sensing pixels P11~Pmn receive the reference voltage Vref. The reset and selection unit 20 outputs a reset signal to the reset terminals R1~Rm of all the sensing pixels P11~Pmn, keeping all of the photo detectors PD biased at the voltage Vref for exposure. In this case, the photo detectors PD of all the sensing pixels P11~Pmn generate their sensing currents. The operational amplifier OP of the second signal reading unit 42 obtains a summation of all the sensing currents, i.e. the current sum Iout(sum), from the measuring terminal M. After the operational amplifier OP converts the current sum Iout(sum) into an output signal, the output signal is output from the output terminal Vout_op of the operational amplifier OP and used as a measured value of the optical sensing. The output signal here is an output voltage. Since all the sensing pixels P11~Pmn are charged and exposed at the same time, this embodiment provides a relative large photo sensing area for applications such as ambient brightness detection and pulse detection.

The second operation mode is not limited to the above-mentioned scheme. That is, not all the sensing pixels P11~Pmn of the active pixel sensing array 10 need to be detected. These sensing pixels P11~Pmn can be divided into a plurality of groups. For example, sensing pixels in the same row (e.g., P11~P1n) or multiple rows form a group. The reset and selection unit 20 outputs the reset signals to the reset terminals of the sensing pixels in the same group, so that the photo detectors PD have a bias at the voltage Vref for exposure. In this case, the photo detectors PD of all the sensing pixels in the same group generate their sensing currents. Therefore, the operational amplifier OP of the second signal reading unit 42 obtains the summation of the sensing currents in the group, i.e. the current sum Iout(sum). Likewise, after the operational amplifier OP converts the current sum Iout(sum) of the group into a sensing voltage, the sensing voltage is output via the output terminal Vout_op as the measured value of the optical sensing. This scheme allows one to select appropriate groups according to the actual area to be detected.

Figure 4:
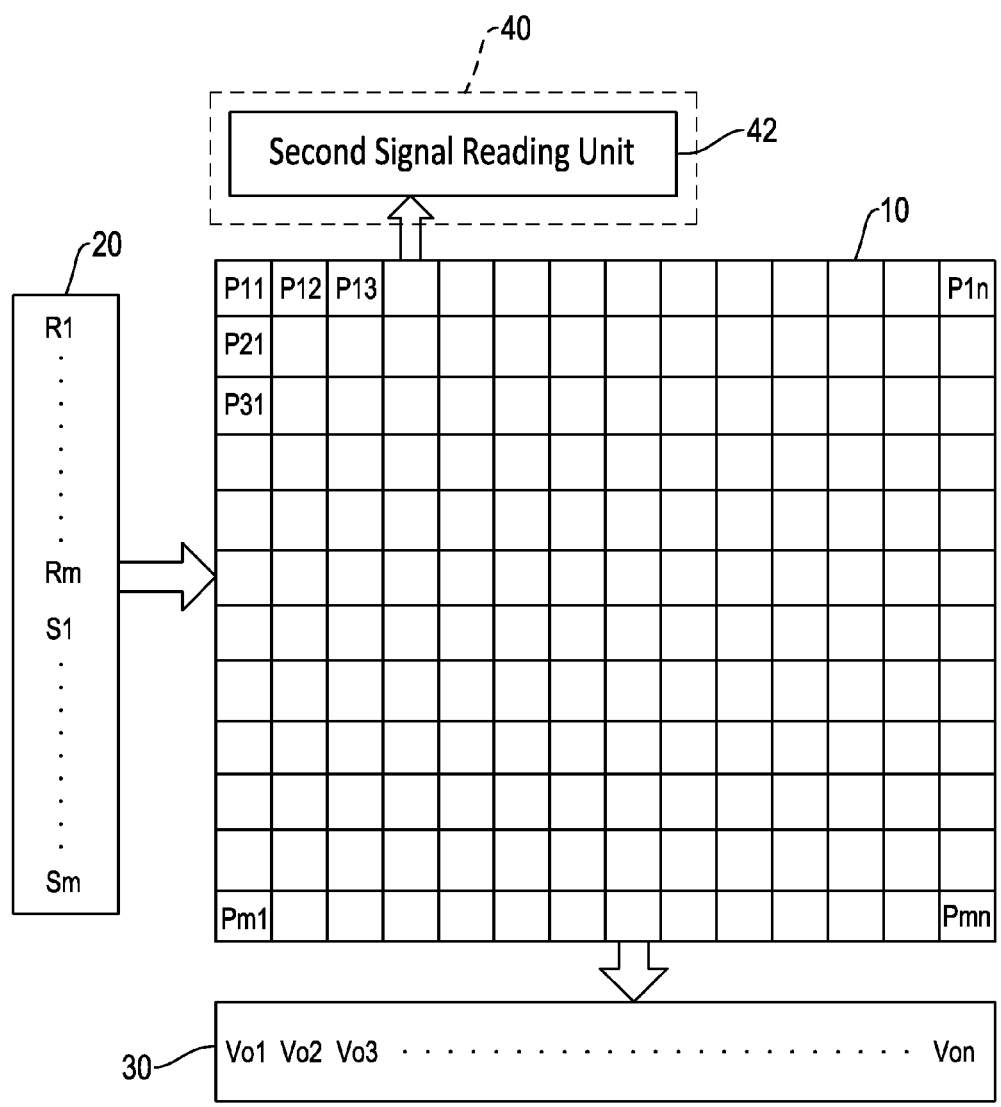
FIG. 4 is a circuit block diagram of a second embodiment of the active pixel sensor device.
Figure 5:
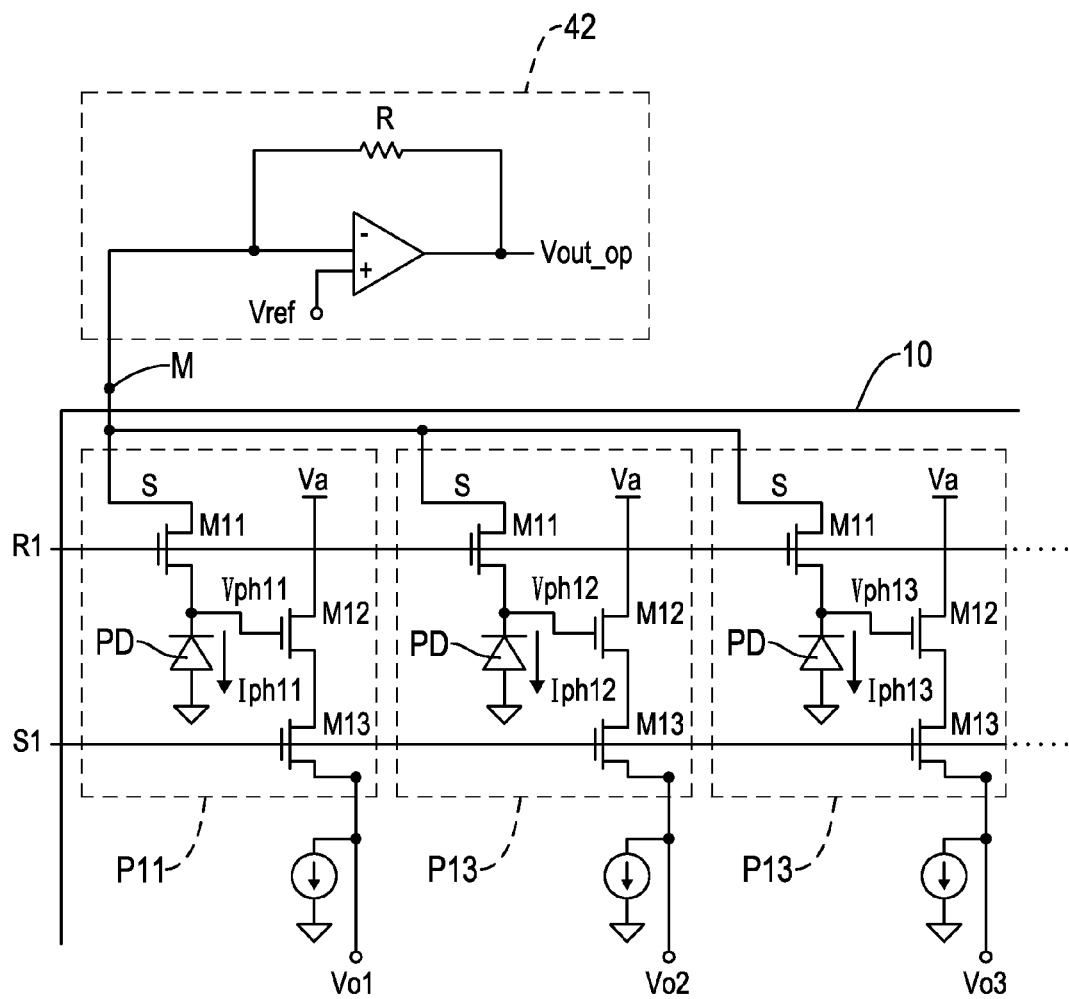
FIG. 5 is a circuit diagram of the second embodiment of the active pixel sensor device.

Please refer to FIGS. 4 and 5 for a second embodiment of the active pixel sensor device. The second embodiment is similar to the first embodiment except that the synchronous reading circuit 40' includes only a second signal reading unit 42. Besides the embodiment shown in FIG. 5, the second signal reading unit 42 can have a circuit configuration shown in FIG. 3 or some other signal reading circuit. The synchronous reading circuit 40' in this embodiment omits the operation mode switching unit 41 of the first embodiment. This is because the work power Vdd required by the sensing pixels P11~Pmn can be the same as the reference voltage Vref of the second signal reading unit 42. Based on the virtual ground characteristic of the operational amplifier, the inverting input terminal (−) of the operational amplifier OP has a voltage level equivalent to the reference voltage Vref of the non-inverting input terminal (+). Therefore, the operation mode switching unit 41 can be omitted to simplify the circuit configuration.

The following paragraphs further describe the actions of the second embodiment in FIGS. 4 and 5 under the first and second operation modes.

With reference to FIG. 5, the reset and selection unit 20 and the first signal reading unit 30 execute, for example, the application of scanning fingerprint under the first operation mode. The reset and selection unit 20 and the first signal reading unit 30 in this embodiment are the same as those in the first embodiment. Therefore, they have the same first operation mode, which is not repeated again. In the second operation mode of this embodiment, the power terminals S of all the sensing pixels P11~Pmn connect to the inverting input terminal (−) of the operational amplifier OP of the second signal reading unit 42 via the measuring terminal M. When the reset and selection unit 20 outputs the reset signal to the reset terminals R1~Rm of all the sensing pixels P11~Pmn, keeping the photo detectors PD reversely biased at the voltage Vref for exposure, the photo detectors PD of all the sensing pixels P11~Pmn generate their sensing currents. Therefore, the operational amplifier OP of the second signal reading unit 42 obtains the summation of the sensing currents, i.e. the current sum Iout(sum), from the measuring terminal M and converts the current sum Iout(sum) into a sensing voltage. The sensing voltage is then output via the output terminal Vout_op of the operational amplifier OP as the measured value of the optical sensing. Since all the sensing pixels P11~Pmn are simultaneously charged and exposed, this embodiment can provide a large photo sensing area for such applications as ambient brightness detection or pulse detection.

Figure 6:
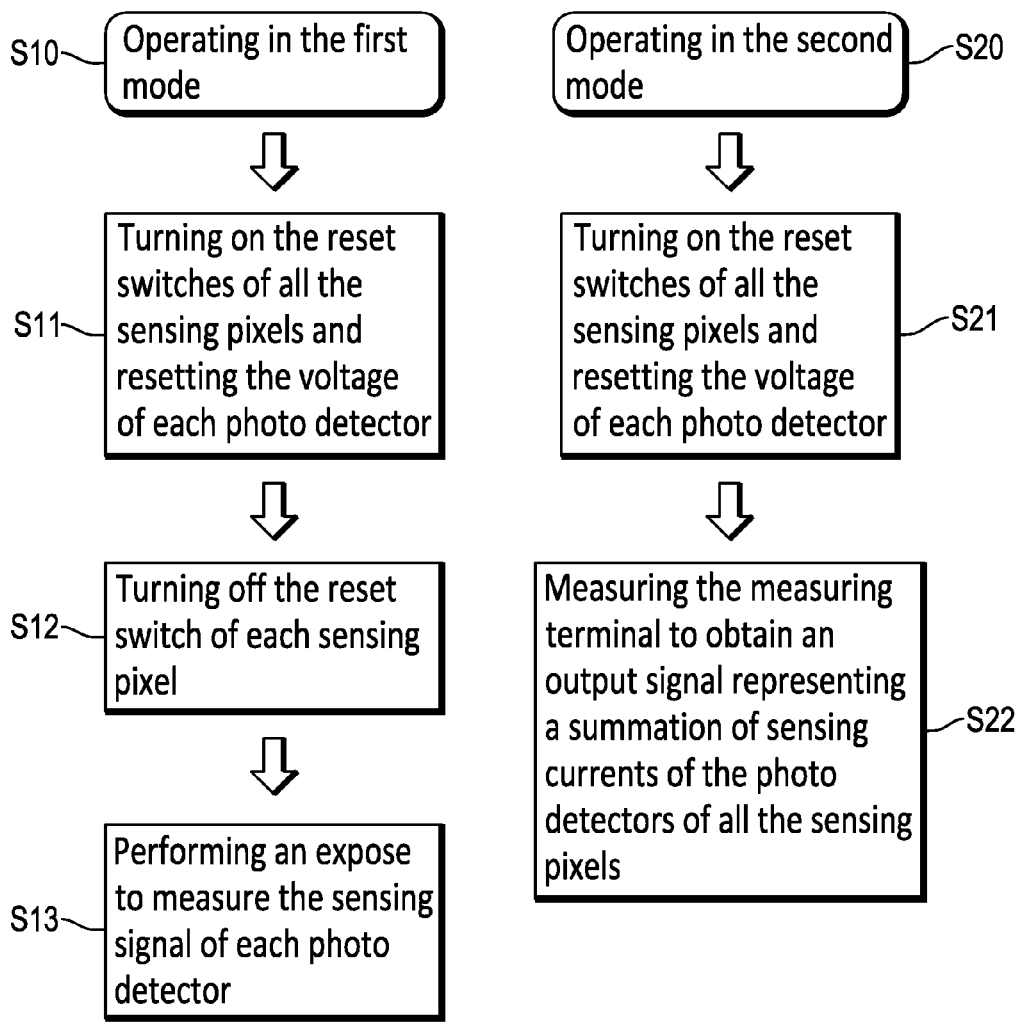
FIG. 6 is a flowchart for a method of operating the active pixel sensor device.
Figure 7:
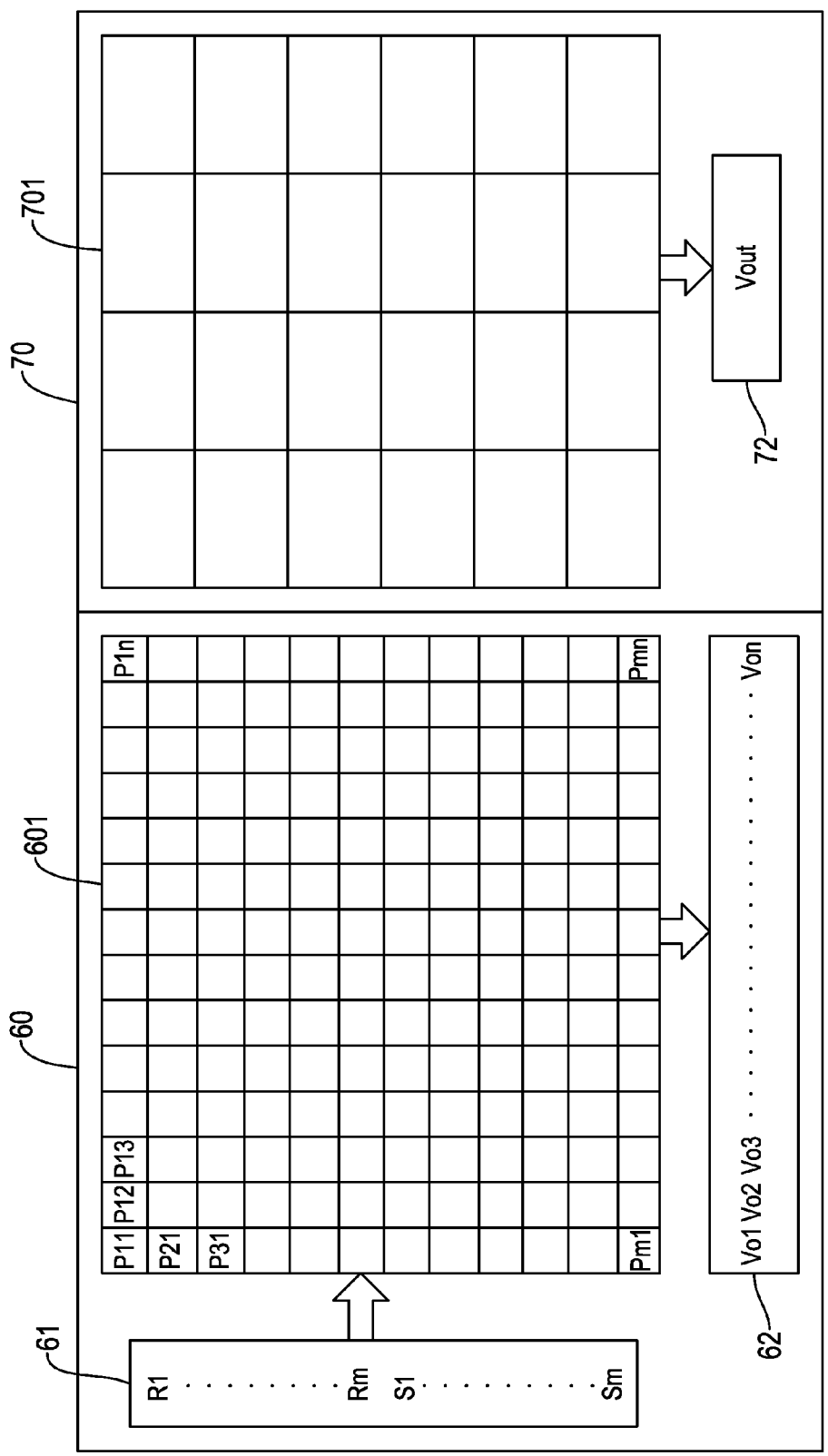
FIG. 7 is a circuit block diagram for a conventional optical sensor device that integrates two applications.

With reference to FIG. 6, based on the above-mentioned embodiments of the active pixel sensor device, the operating method of the active pixel sensor device can be summarized into one operating in the first mode S10 and the other operating in the second mode S20.

Under the first mode, the method includes the steps of:
turning on the reset switches M11 of all the sensing pixels P11~Pmn and resetting the voltage of each photo detector PD (step S11);
turning off the reset switch M11 of each sensing pixel P11~Pmn (step S12);
performing an exposure to measure the sensing signal of each photo detector PD (step S13); and
under the second mode, including the steps of:
turning on the reset switches M11 of the sensing pixels P11~Pmn and resetting the voltage of each photo detector PD (step S21); and
measuring the measuring terminal M to obtain an output signal representing a summation of sensing currents of the photo detectors PD of all the sensing pixels P11~Pmn (step S22).

The invention in the first mode can be used for fingerprint recognition. In the second mode, the invention can be used for applications with larger optical sensing areas, such as ambient brightness detection.

In summary, the active pixel sensor device uses the synchronous reading circuit to connect the power terminals of all the sensing pixels thereof. Therefore, it detects the summation of sensing currents flowing through all of the sensing pixels. The summation of the sensing currents is converted into an output signal that is output to represent the measured value of optical sensing. In addition to reading the sensing voltage of each active sensing pixel for executing, for example fingerprint recognition, the active pixel sensor device further controls the synchronous reading circuit to read the summation of the sensing currents of all the sensing pixels and to convert the summation into the output signal. The output signal represents the measured value of the optical sensing. Therefore, the active pixel sensor device uses the same active pixel sensing array for applications with larger optical sensing areas, such as but not limited to ambient brightness detection and pulse measurement. Therefore, the invention only requires a single active pixel sensing array to provide high-resolution fingerprint recognition as well as the integrated functions of ambient brightness detection or pulse measurement. It has the advantages of low production cost, simple circuit, and small size. Moreover, the user only needs to place his finger on the same active pixel sensing array to obtain different recognition/detection results under different operation modes. It is relatively easy and convenient.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An active pixel sensor device comprising:
   an active pixel sensing array having a plurality of sensing pixels arranged in a form of an array, wherein each sensing pixel has a power terminal, and the sensing pixels are divided into at least one group; and
   a reading circuit comprising a second signal reading unit connected to the power terminals of the sensing pixels of the active pixel sensing array for detecting a current sum of the sensing pixels of the at least one group, wherein the current sum is output to the second signal reading unit via the power terminals, the second signal reading unit converts the current sum into an output voltage and outputs the output voltage as a measured value of optical sensing, and the second signal reading unit comprises:
   an operational amplifier having an inverting input terminal, a non-inverting input terminal, and an output terminal, wherein the inverting input terminal connects to the power terminals of the sensing pixels and the non-inverting input terminal connects to a reference voltage; and
   a resistor connected between the inverting input terminal and the output terminal of the operational amplifier.

2. The active pixel sensor device of claim 1, wherein the sensing pixels are divided into a plurality of groups, each of the groups comprises at least one row of the sensing pixels.

3. The active pixel sensor device of claim 1, wherein the sensing pixels form a single group.

4. The active pixel sensor device of claim 1, wherein
   each sensing pixel has a reset terminal, a selection terminal and a voltage output terminal; and
   the active pixel sensor device further comprises:
   a reset and selection unit connecting to the reset terminal and the selection terminal of each sensing pixel for outputting a reset signal to the reset terminal of each sensing pixel and outputting a selection signal to the selection terminal of each sensing pixel; and
   a first signal reading unit connecting to the voltage output terminal of each sensing pixel for reading the sensing signal of each sensing pixel.

5. An active pixel sensor device, comprising:
   an active pixel sensing array having a plurality of sensing pixels arranged in a form of an array, wherein each sensing pixel has a power terminal, and the sensing pixels are divided into at least one group; and
   a reading circuit connecting to the power terminals of all of the sensing pixels of the active pixel sensing array for detecting a current sum of the sensing pixels of the at least one group, wherein the current sum is output to the reading circuit via the power terminals, the reading circuit converts the current sum into an output signal and outputs the output signal as a measured value of optical sensing, wherein the reading circuit comprises:
   an operation mode switching unit that includes a first switch and a second switch, wherein one end of first switch and one end of the second switch are both connected to the power terminals of the sensing pixels, and the other end of the first switch connects to a work power so that the power terminals of the sensing pixels are connected with the work power; and
   a second signal reading unit connected to the other end of the second switch, thereby connecting to the power terminals of all the sensing pixels via the second switch, for converting the current sum of the sensing pixels into the output signal and outputting the output signal.

6. The active pixel sensor device of claim 5, wherein the sensing pixels are divided into a plurality of groups, each of the groups comprises at least one row of the sensing pixels.

7. The active pixel sensor device of claim 5, wherein the sensing pixels form a single group.

8. An active pixel sensor device, comprising:
   an active pixel sensing array having a plurality of sensing pixels arranged in a form of an array, wherein each sensing pixel has a power terminal, and the sensing pixels are divided into at least one group; and
   a reading circuit comprising a second signal reading unit, which is connected to the power terminals of the sensing pixels of the active pixel sensing array for detecting a current sum of the sensing pixels of the at least one group, wherein the current sum is output to the second signal reading unit via the power terminals, the second signal reading unit coverts the current sum into an output voltage and outputs the output voltage as a measured value of optical sensing, and the second signal reading unit comprises:
   an operational amplifier having an inverting input terminal, a non-inverting input terminal and an output terminal, wherein the inverting input terminal connects to the power terminals of the sensing pixels and the non-inverting input terminal connects to a reference voltage;
   a capacitor connected between the inverting input terminal and the output terminal of the operational amplifier; and
   a switch connected in parallel with the capacitor.

9. The active pixel sensor device of claim 8, wherein the sensing pixels are divided into a plurality of groups, each of the groups comprises at least one row of the sensing pixels.

10. The active pixel sensor device of claim 8, wherein the sensing pixels form a single group.

11. The active pixel sensor device of claim 8, wherein
   each sensing pixel has a reset terminal, a selection terminal and a voltage output terminal; and
   the active pixel sensor device further comprises:
   a reset and selection unit connecting to the reset terminal and the selection terminal of each sensing pixel for outputting a reset signal to the reset terminal of each sensing pixel and outputting a selection signal to the selection terminal of each sensing pixel; and a first signal reading unit connecting to the voltage output terminal of each sensing pixel for reading the sensing signal of each sensing pixel.

12. The active pixel sensor device of claim 11, wherein each sensing pixel comprises:
   a reset switch comprising the power terminal, the reset terminal, and a signal terminal;
   a source follower connected to an operating power and the signal terminal of the reset switch;
   a selection switch connected to the source follower and comprising the selection terminal and the voltage output terminal; and
   a photo detector connected to the reset switch, wherein the reset switch turns on and off to store charges in the photo detector.

13. An operating method of an active pixel sensor device that has a plurality of sensing pixels and the sensing pixels are divided into at least one group, wherein each sensing pixel has a power terminal, a photo detector, and a reset switch, with the photo detector generating a sensing signal in response to external light, the reset switch connected between the power terminal and the photo detector, and the power terminal connected to a power source via a measuring terminal; wherein the operating method has a first mode and a second mode, and comprises the steps of:
   in the first mode executing the steps of:
   turning on the reset switches of the sensing pixels and resetting voltages of the photo detectors;
   turning off the reset switches of the sensing pixels; and
   separately measuring the sensing signal of each photo detector; and
   in the second mode executing the steps of:
   turning on the reset switches of the sensing pixels and resetting the voltages of the photo detectors; and
   measuring the measuring terminal to obtain an output signal representing the summation of sensing currents of the photo detectors of the sensing pixels of the at least one group.

14. The operating method of claim 13, wherein the power source provides a first voltage to the power terminals under the first mode, and the power source provides a second voltage to the power terminals under the second mode.

15. The operating method of claim 13, wherein the first mode is for fingerprint recognition.

16. The operating method of claim 13, wherein the second mode is for detecting ambient brightness.

17. An active pixel sensor device, comprising:
   an active pixel sensing array having a plurality of sensing pixels arranged in a form of an array, wherein each sensing pixel has power terminal, a reset terminal, a selection terminal, a voltage output terminal and a photo detector, the power terminal of each sensing pixel is connected to a power source via a measuring terminal, and the sensing pixels are divided into at least one group;
   a reset and selection unit connecting to the reset terminal and the selection terminal of each sensing pixel for outputting a reset signal to the reset terminal of each sensing pixel and outputting a selection signal to the selection terminal of each sensing pixel;
   a first signal reading unit connected to the voltage output terminal of each sensing pixel, wherein first signal reading unit is adapted to read the sensing signal of the photo detector of each sensing pixel in a first mode; and
   a reading circuit connecting to the power terminals of the sensing pixels of the active pixel sensing array, wherein the reading circuit is adapted to detect a current sum of the sensing pixels of the at least one group in a second mode.

18. The active pixel sensor device of claim 17, wherein the reading circuit comprises:
   an operation mode switching unit that includes a first switch and a second switch, wherein one end of first switch and one end of the second switch are both connected to the power terminals of the sensing pixels, and the other end of the first switch connects to a work power so that the power terminals of the sensing pixels are connected with the work power; and
   a second signal reading unit connected to the other end of the second switch, thereby connecting to the power terminals of the sensing pixels via the second switch, for converting the current sum of the sensing pixels into the output signal and outputting the output signal.

19. The active pixel sensor device of claim 17, wherein the reading circuit comprises:
   a second signal reading unit connecting to the power terminals of the sensing pixels for converting the current sum of the sensing pixels into the output voltage and outputting the output voltage as a measured value of optical sensing.

20. The active pixel sensor device as claimed in claim 17, wherein
   the reading circuit comprises:
   a second signal reading unit connected to the power terminals of the sensing pixels for converting the current sum of the sensing pixels into an output current and outputting the output current as a measured value of optical sensing.

* * * * *